United States Patent
Sierawski et al.

(10) Patent No.: US 6,993,364 B2
(45) Date of Patent: Jan. 31, 2006

(54) COMMUNICATION DEVICE WITH HISTORY BASED ALERTS AND METHOD THEREFOR

(75) Inventors: Jeffrey A. Sierawski, Grayslake, IL (US); Mark A. Barros, Wellington, FL (US); John H. Bujold, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 30 days.

(21) Appl. No.: 10/447,633

(22) Filed: May 29, 2003

(65) Prior Publication Data

US 2004/0242284 A1 Dec. 2, 2004

(51) Int. Cl.
*H04Q 7/20* (2006.01)

(52) U.S. Cl. ...................... 455/567; 455/415
(58) Field of Classification Search ............... 455/567, 455/418, 566, 414.1, 415; 379/373.01, 373.02, 379/373.03, 374.01, 374.03, 376.01, 88.19, 379/88.21

See application file for complete search history.

(56) References Cited

U.S. PATENT DOCUMENTS

| | | | | |
|---|---|---|---|---|
| 5,471,204 A | * | 11/1995 | Kudoh et al. | 340/7.51 |
| 5,870,684 A | * | 2/1999 | Hoashi et al. | 455/567 |
| 6,005,927 A | * | 12/1999 | Rahrer et al. | 379/142.01 |
| 6,448,885 B1 | * | 9/2002 | Abe et al. | 340/7.58 |
| 6,621,894 B2 | * | 9/2003 | Fujino et al. | 379/142.06 |
| 2002/0094806 A1 | * | 7/2002 | Kamimura | 455/415 |

\* cited by examiner

*Primary Examiner*—Erika A. Gary
(74) *Attorney, Agent, or Firm*—Randi L. Karpinia

(57) ABSTRACT

A communication device (100) includes a transceiver (115) for receiving a call, a received calls memory (145) for storing call sources (300) and for storing an associated call count (315) for each call source (310), a user preferences memory (140) for storing a set of call quantity categories and a corresponding set of alerts, and a processor (120). The processor (120) is programmed to: identify a call source of a received call, retrieve a call count for the call source, categorize the call count into a call quantity category, provide a command signal to an alert circuit (130) identifying a unique alert associated with the call quantity category, and optionally increment the call count. The communication device (100) further includes the alert circuit (130) for alerting using the unique alert identified by the processor (120).

20 Claims, 3 Drawing Sheets

| CALL QUANTITY | CALL QUANTITY CATEGORY | ALERT |
|---|---|---|
| 0 | UNKNOWN | NO ALERT |
| 1-4 | ACQUAINTANCE | AUDIBLE SONG A |
| 5-19 | BUDDY | VIBRATION/LIGHT |
| <20 | REPEAT CALLER | AUDIBLE SONG B |

*FIG. 2*

| CALL SOURCE | CALL COUNT |
|---|---|
| SOURCE A | A CALLS |
| SOURCE B | B CALLS |
| ⋮ | ⋮ |
| SOURCE N | N CALLS |

*FIG. 3*

COMMUNICATION DEVICE WITH HISTORY BASED ALERTS AND METHOD THEREFOR

BACKGROUND OF THE INVENTION

1. Field of the Invention

This invention relates in general to electronic devices and more particularly to communication devices with alert personalization capability.

2. Description of the Related Art

Historically, communication devices, such as cellular telephones and two way messaging devices, have had the ability to receive data and/or voice messages sent from one or more communication systems and perform standard functions in response to message or call receipt, such as storing the message, displaying the message, or alerting the user of receipt of the message or incoming call. The user is alerted of receipt of a new message, an incoming call, or missed incoming call by an audible, visual, or vibratory alert. Many communication devices today include caller identification capability in which an identification of the calling party is displayed when a call is received. Typically, the caller identification is a telephone number of the source of the incoming call. Some communication devices include a phonebook application which ties incoming caller identification telephone numbers to stored telephone numbers in the phonebook application and then displays the identification (such as caller's name) attached by the device user to that telephone number.

One drawback of the currently available technology is the inconvenience of viewing the display in order to identify the source of the incoming call. For example, when the device user is driving in an automobile, looking at the display of a cellular telephone or messaging device prior to answering a call can be distracting and potentially dangerous.

Some communication devices today provide functionality for unique alerts to be assigned to individual entries of a user's phone book. The device user manually assigns a different alert to each caller identification and stores the information in the phonebook. This can be time consuming and tedious, especially given that the phonebook size can be large and continuously changing.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages all in accordance with the present invention.

FIG. 2 illustrates a user preferences memory for use within the communication device of FIG. 1.

FIG. 3 illustrates one embodiment of a received call memory for use within the communication device of FIG. 1.

DETAILED DESCRIPTION OF THE PREFERRED EMBODIMENT(S)

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more than one. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The terms "program," "software application," and the like, as used herein, are defined as a sequence of instructions designed for execution on a computer system. A program, computer program, or software application may include a subroutine, a function, a procedure, an object method, an object implementation, an executable application, an applet, a servlet, source code, object code, a shared library/dynamic load library and/or other sequence of instructions designed for execution on a computer system.

Figure 1:
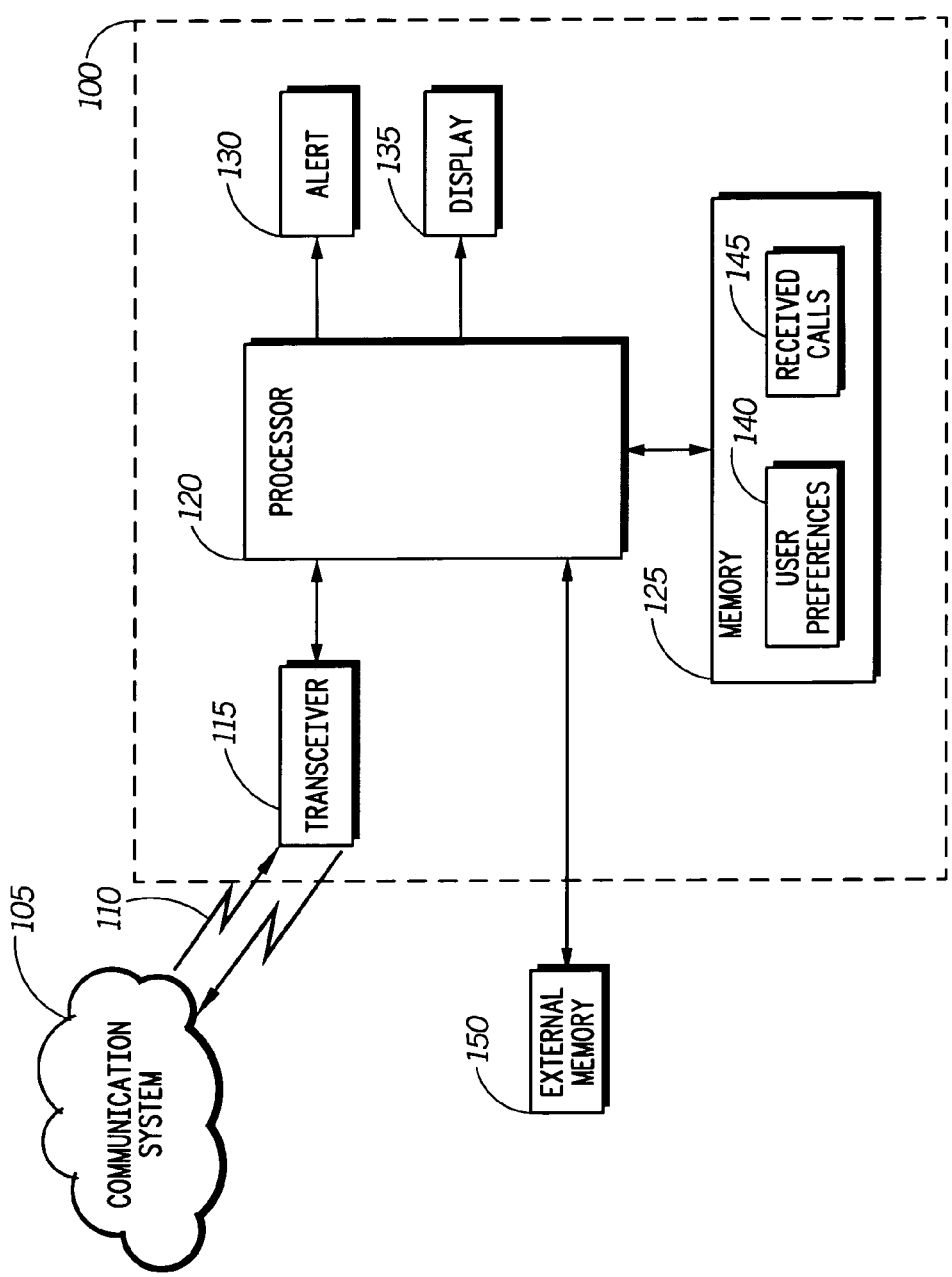
FIG. 1 is an electronic block diagram of a communication device.

FIG. 1 is an electronic block diagram of a communication device 100. As illustrated in FIG. 1, the communication device 100 includes a transceiver 115, a processor 120, a memory 125, a alert circuit 130, and a display 135. It will be appreciated by one of ordinary skill in the art that the communication device 100 can be a wireless communication device, such as a mobile cellular telephone, a mobile radio data terminal, a mobile cellular telephone having an attached data terminal, or a two way messaging device. Similarly, the communication device 100 can be a fixed network device which operates, for example, on a local area network (LAN), a wide area network (WAN) or a combination of both. The fixed network device can be one of a plurality of spatially co-located computers, which are typically located within a room, building or campus of buildings and are sharing common resources, communicating with each other on a computer network in a manner well known to one of ordinary skill in the art. In the following description, the term "communication device" refers to any of the devices mentioned above or an equivalent.

The transceiver 115 intercepts signals 110 transmitted from one or more communication systems 105. Preferably, each signal 110 includes a caller identification for identifying the source of the call associated with the signal 110. For example, the caller identification can be a telephone number from which the call originated. The transceiver 115 preferably employs conventional demodulation techniques for receiving the signals 110. The transceiver 115 is coupled to the processor 120 and is responsive to one or more commands from the processor 120. For example, when the transceiver 115 receives a command from the processor 115, the transceiver 115 generates a signal for communication via the communication system 105. In general, the transceiver 115 provides the receive and transmit functionality for communicating within one or more communication calls.

In an alternative embodiment (not shown), the communication device 100 includes a receiver circuit and a transmitter circuit performing the functionality of the transceiver circuit (not shown). It will be appreciated by one of ordinary skill in the art that other similar electronic block diagrams of the same or alternate type can be utilized for the communication device 100.

Coupled to transceiver 115 is the processor 120 utilizing conventional signal-processing techniques for processing received signals. It will be appreciated by One of ordinary skill in the art that additional processors can be utilized as required to handle the processing requirements of the processor 120. The processor 120 decodes an address in the demodulated data of the received signal, compares the decoded address with one or more addresses stored in an address memory (not shown) of the memory 125, and, when a match is detected, proceeds to process the remaining portion of the received signal.

Upon receipt and processing of a message, the processor 135 preferably also generates a command signal to the display 135 to generate a visual notification of the receipt of the signal 110. When the display 135 receives the command signal from the processor 120, a call indication is displayed. The call indication, for example can be caller identification associated with a call source when the signal 110 is a telephonic call. The call indication, alternatively, can be a name or image associated with the caller identification received within the signal 110 that was manually set by the device user and stored in the memory 125 for later utilization. The display 135 can be, for example, a liquid crystal display utilized to display text and graphics. It will be appreciated by one of ordinary skill in the art that other similar displays such as cathode ray tube displays can be utilized for the display 135.

Upon receipt and processing of a message or call, the processor 120 generates a command signal to the alert circuit 130 as a notification that the signal 110 has been received. The alert circuit 130 can include a speaker (not shown) with associated speaker drive circuitry capable of playing melodies and other audible alerts, a vibrator (not shown) with associated vibrator drive circuitry capable of producing a physical vibration, or one or more light emitting diodes (LEDs) (not shown) with associated LED drive circuitry capable of producing a visual alert. It will be appreciated by one of ordinary skill in the art that other similar alerting means as well as any combination of the audible, vibratory, and visual alert outputs described can be used for the alert circuit 130. In general, the alert circuit 130 provides an alert notification of a received call.

To perform the necessary functions of the communication device 100, the processor 120 is coupled to the memory 125. The memory 125, in accordance with the present invention, includes a user preferences memory 140 and a received calls memory 145. The memory 125, for example, can include a random access memory (RAM), a read-only memory (ROM), and an electrically erasable programmable read-only memory (EEPROM)(not shown).

In addition to the memory 125, the communication device 100 can be further coupled to an external memory storage device 150 to provide the memory requirements of the communication device 100, including to provide the functionality of the user preferences memory 140 and the received calls memory 145. The external memory storage device 150 can be connected directly to the communication device 100, or can be connected via a wireless connection such as an infrared, Bluetooth or radio frequency interface. The external memory storage device 150, for example, can be a subscriber identification module (SIM) card. A SIM card is an electronic device typically including a microprocessor unit and a memory suitable encapsulated within a small flexible plastic card. The SIM card additionally includes some form of interface for communicating with an external device or system. The SIM card can be used to transfer a variety of information from/to the communication device 100 and/or any other compatible device.

FIG. 2 illustrates a user preferences memory 140 for use within the communication device 100 of FIG. 1. The user preferences memory 140, for example, can be memory storage space within the memory 125 or alternatively can be memory storage space within the external memory storage device 150. As illustrated in FIG. 2, the user preferences memory 140 preferably stores a plurality of call quantity categories 205, each category being associated with one or more quantities of received calls 200. A plurality of associated alerts 210 are also stored within the user preferences memory 140. Each call quantity category 215 has an associated alert 220. The association of a particular alert to each category of call quantity provides the device user an indication of the type of caller without requiring any manual setup or customization.

FIG. 3 illustrates one embodiment of a received call memory 145 for use within the communication device 100 of FIG. 1. The received call memory 145, for example, can be memory storage space within the memory 125 or alternatively can be memory storage space within the external memory storage device 150. The received call memory 145 preferably stores a plurality of call sources 300 identifying the call sources of all received calls for the communication device 100. The received call memory 145 further stores a plurality of calls counts 305. Each call source 310 has an associated call count 315 tallying the quantity of calls and/or messages received from that call source 310. Each time a new call or message is received from a call source 310, the associated call count 315 for that call source 310 is incremented. The processor 120 preferably uses the associated call count 315 to categorize the call source 310 into one of the plurality of call quantity categories 205 each time that a call or message is received from the call source 310.

Figure 4:
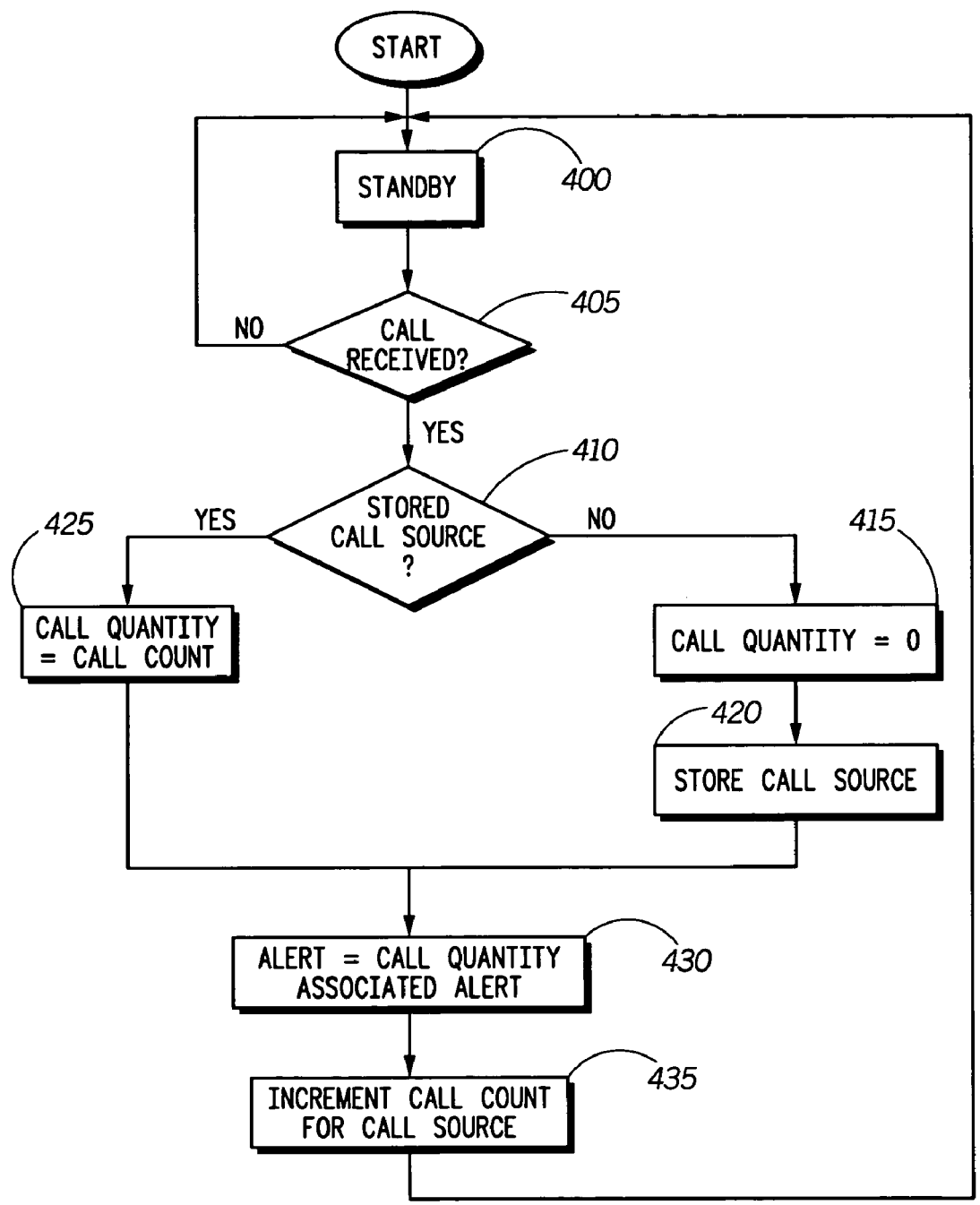
FIG. 4 is a flowchart illustrating one embodiment of the operation of the communication device.

Referring back to FIG. 1, the processor 120, in accordance with the present invention, is programmed to utilize the information stored in the user preferences memory 140 and the received calls memory 145 to identify the appropriate alert to utilize upon receipt of an incoming message or call. FIG. 4 is a flowchart illustrating one embodiment of the operation of the communication device in identifying the alert to be utilized.

The process of FIG. 4 begins with Step 400, in which the communication device 100 is in standby mode. Standby mode runs the communication device 100 with minimal power to conserve battery life. Next, in Step 405, the process checks for a received call. For example, the processor 120 periodically checks whether one or more signals 110 have been received from one or more communication systems 105 including a message and/or a voice call. When no call has been received, the process cycles back and periodically checks for a received call in Step 405. When a call has been received, the process continues to Step 410, in which the process checks whether the source of the received call is a stored source. For example, the processor 120 compares the caller identification of the call source of the received call with the plurality of call sources 300 stored in the received calls memory 145. In Step 415, when the source of the received call is not contained within the plurality of call sources 300, the call quantity for the call source is set to zero. Next, in Step 420 the received call source is stored. For example, the communication device 100 stores the new received call source within the received calls memory 145.

In Step 425, when the received call source is a stored call source as evaluated in Step 410, the call quantity is set to the call count associated with that call source. For example, the processor 120 retrieves the call count 315 for the call source 310 when the call source 310 is the source of the received signal 110. Next, and after Step 420, the alert is set to the alert associated with the call quantity 430. For example, the processor 120 determines the call quantity category 215 by comparing the count 315 with the call quantity ranges of each of the stored call quantity categories in the user preferences memory 140. The processor 120 then identifies the associated alert 220 for the call quantity category 215. Next, in Step 435, the call count is incremented for the call source of the received call. The process then cycles back to Step 400, in which the communication device 100 returns to standby. It will be appreciated by those of ordinary skill in the art that the communication device 100 can further operate by alerting, displaying, participating in a communication call, etc. upon completion of the process of FIG. 4.

An exemplary scenario of the operation of FIG. 4 is illustrated below. To begin the process, the communication device 100 receives a first communication call including a first caller identification of a first call source 310. For example, the first communication call is received by the transceiver 115 from a communication system 105. The processor 120 compares the first caller identification with each of a plurality of stored caller identifications of each of a plurality of stored call sources 300 stored in the received calls memory 145. When the first caller identification does not match one or more of the plurality of stored caller identifications stored in the received calls memory 145, the processor 120 sets a first call count 315 to zero and stores the first call source 310 and the first call count 315 in the received calls memory 145. The processor 120 then retrieves the first call count 315 associated with the first call source 310 from the received calls memory 145. Next, the processor 120 compares the first call count 315 with each call quantity range 200 associated with each of a plurality of call quantity categories 205 stored in the user preferences memory 140 to identify a first call quantity category. The processor 120 then sends a command to the alert circuit 130 identifying the appropriate alert 210 to use and, in response, the alert circuit 130 alerts using a first alert associated with the first call quantity category. Preferably, the processor 120 then increments the value of the first call count 315 stored in the received calls memory 145.

Similarly, the communication device 100 can thereafter receive a second communication call including a second caller identification of a second call source 315. For example, the second communication call is received by the transceiver 115 from a communication system 105. The processor 120 compares the second caller identification with each of a plurality of stored caller identifications of each of a plurality of stored call sources 300 stored in the received calls memory 145. When the second caller identification does not match one or more of the plurality of stored caller identifications the received calls memory 145, the processor 120 sets a second call count 315 to zero and stores the second call source 310 and the second call count 315 in the received calls memory 145. The processor 120 then retrieves the second call count 315 associated with the second call source 310 from the received calls memory 145. Next, the processor 120 compares the second call count 315 with each call quantity range 200 associated with each of a plurality of call quantity categories 205 stored in the user preferences memory 140 to identify a second call quantity category. The processor 120 then sends a command to the alert circuit 130 identifying the appropriate alert 210 to use and, in response, the alert circuit 130 alerts using a second alert associated with the second call quantity category. Preferably, the processor 120 then increments the value of the second call count 315 stored in the received calls memory 145. It will be appreciated by those of ordinary skill in the art that this process can continue for a plurality of communication calls and a plurality of communication sources. It will further be appreciated by those of ordinary skill in the art that the second call quantity category can be the same as the first call quantity category or alternatively can be different from the first call quantity category. Further, the second alert can be the same as, or alternatively different from, the first alert.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A communication device comprising:
   a transceiver for receiving at least one call;
   a first memory for storing a plurality of call source identifiers identifying call sources of a plurality of received calls and further for storing an associated call count for each call source, each call count indicating a quantity of calls previously received from the respective call source;
   a second memory for storing a plurality of call quantity categories and a plurality of associated alerts, wherein each call quantity category has an associated alert and wherein the plurality of associated alerts are different from another:
   a processor coupled to the transceiver, the first memory, and the second memory, wherein the processor is programmed to:
   process a received call including identifying a call source of the received call,
   retrieve a call count for the call source from the first memory,
   categorize the call count into a call quantity category of the plurality of call quantity categories, and
   generate a command signal identifying an alert of the plurality of associated alerts, the alert being associated with the call quantity category; and
   an alert circuit, coupled to the processor, for alerting using the alert identified by the processor.

2. A communication device as recited in claim 1, wherein the processor is further programmed to:
   increment the call count for the call source responsive to processing of the received call.

3. A communication device as recited in claim 2, wherein the processor is further program to:

process a second received call from the call source;
categorize the call source into a second call quantity category of the plurality of call quantity categories based on the incremented call count, the second call quantity category being different than the call quantity category; and
generate a second command signal identifying a second alert associated with the second call quantity category, the second alert being different than the alert; and
wherein the alert circuit is further operable to alert the user of the communication device using the second alert.

4. A communication device as recited in claim 1, further comprising:
a display coupled to the processor for providing a visual notification of receipt of the received call.

5. A communication device as recited in claim 1, wherein the processor is further programmed to:
process a second received call including identifying a second call source of the second received call;
categorize the second call source into a second call quantity category of the plurality of call quantity categories based on the incremented call count; and
generate a second command signal identifying a second alert associated with the second call quantity category; and
wherein the alert circuit is further operable to alert the user of the communication device using the second alert.

6. A communication device as recited in claim 5, wherein the second call quantity category is different than the call quantity category and the second alert is different than the alert.

7. A communication device as recited in claim 1, wherein the plurality of call quantity categories are independent of the plurality of call sources.

8. A method within a communication device for providing history-based alerts, the method comprising:
receiving a communication call from a call source;
determining a call count for the call source, wherein the call count indicates a quantity of calls previously received from the call source;
categorizing the call count into a call quantity category of a plurality of call quantity categories, the plurality of call quantity categories being associated with a corresponding plurality of alerts, each of the plurality of alerts being different from one another, each call quantity category of the plurality of call quantity categories being associated with a corresponding alert of the plurality of alerts; and
setting an alert of the plurality of alerts corresponding to the call quantity category.

9. A method as recited in claim 8, further comprising:
determining whether an identifier for the call source is stored in a memory of the communication device prior to determining the call count; and
when the identifier for the call source is determined not to be stored, storing the identifier for the call source in the memory.

10. A method as recited in claim 8, further comprising:
incrementing the call count associated with the call source.

11. A method as recited in claim 10, further comprising:
receiving a second communication call from the call source;
determining a second call count for the call source, wherein the second call count is the incremented call count;
categorizing the call source into a second call quantity category of the plurality of call quantity categories based on the second call count, the second call quantity category being different than the call quantity category; and
setting a second alert of the plurality of alerts corresponding to the second call quantity category, the second alert being different than the alert.

12. A method as recited in claim 8, further comprising:
receiving a second communication call from a second call source;
determining a call count for the second call source, wherein the call count for the second call source is a quantity of calls received from the second call source;
categorizing the second call source into a second call quantity category of the plurality of call quantity categories based on the call count for the second call source; and
setting a second alert of the plurality of alerts corresponding to the second call quantity category.

13. A method as recited in claim 12, wherein the second call quantity category is different than the call quantity category and the second alert is different than the alert.

14. A method as recited in claim 8, wherein the plurality of call quantity categories are call source independent.

15. A method within a communication device for providing history-based alerts, the method comprising:
receiving a first communication call including a first caller identification of a first call source;
comparing the first caller identification with each of a plurality of stored caller identifications of each of a plurality of stored call sources stored in a memory;
in the event that the first caller identification matches at least one of the plurality of stored caller identifications:
retrieving a first call count associated with the first call source from the memory;
comparing the first call count with each call quantity range associated with each of a plurality of call quantity categories to identify a first call quantity category, the plurality of call quantity categories being associated with a corresponding plurality of alerts, each of the plurality of alerts being different from one another, each call quantity category of the plurality of call quantity categories being associated with a corresponding alert of the plurality of alerts;
alerting using a first alert associated with the first call quantity category; and
incrementing the first call count; and
in the event that the first caller identification does not match at least one of the plurality of stored caller identifications;
setting the first call count to zero; and
storing the first caller identification and the first call count in the memory;
receiving a second communication call including a second caller identification of a second call source;
comparing the second caller identification with each of the plurality of stored caller identifications;
in the event that the second caller identification matches at least one of the plurality of stored caller identifications:
retrieving a second call count associated with the second call source from the memory;

comparing the second call count with each call quantity range associated with each of the plurality of call quantity categories to identify a second call quantity category;

alerting using a second alert associated with the second call quantity category; and incrementing the second call count; and in the event that the second called identification does not match at least one of the plurality of stored caller identifications:

setting the second call count to zero; and storing the second caller identification and the second call count in the memory.

16. A method as recited in claim 15, wherein the second call quantity category is different than the first call quantity category and the second alert is different than the first alert.

17. A method as recited in claim 15, further comprising the steps of:

receiving a third communication call including the first caller identification;

retrieving the first call count from the memory;

comparing the first call count with each call quantity range associated with each of the plurality of call quantity categories to identify a third call quantity category, the third call quantity category being different than the first call quantity category; and alerting using a third alert associated with the third call quantity category.

18. A method as recited in claim 17, wherein the third call quantity category is identical to the second quantity category.

19. A method as recited in claim 17, wherein the third call quantity category is different than the second call quantity category.

20. A method as recited in claim 15, wherein the plurality of call quantity categories are independent of the first call source the second call source.

* * * * *